United States Patent [19]

Stein

[11] Patent Number: 4,947,607
[45] Date of Patent: Aug. 14, 1990

[54] SUSPENDED CEILING CONSTRUCTION AND COMPRESSION STRUT THEREFOR

[75] Inventor: Henry G. Stein, Avon, Ohio
[73] Assignee: USG Interiors, Inc., Chicago, Ill.
[21] Appl. No.: 299,792
[22] Filed: Jan. 23, 1989
[51] Int. Cl.$^5$ .............................................. E06B 3/54
[52] U.S. Cl. ........................................ 52/484; 52/488; 52/769; 52/764; 248/200.1; 403/109
[58] Field of Search ................. 52/484, 488, 490, 764, 52/767, 769, 775, 632; 248/200.1, 354.7; 403/109, 377; 135/114

[56] References Cited

U.S. PATENT DOCUMENTS

| | | | |
|---|---|---|---|
| 3,519,293 | 7/1970 | Henning et al. | 248/200.1 X |
| 3,560,032 | 2/1971 | Cohen et al. | 403/371 |
| 3,674,294 | 7/1979 | Kirkham | 403/104 |
| 3,842,561 | 10/1974 | Wong | 52/484 |
| 3,995,823 | 12/1976 | Hensel | 248/327 |
| 4,084,364 | 4/1978 | Jones | 52/484 |
| 4,426,822 | 1/1984 | Gailey | 52/484 X |
| 4,545,166 | 10/1985 | Kielmeyer | 52/484 |

FOREIGN PATENT DOCUMENTS 548222  11/1957  Canada ........................... 248/200.1

OTHER PUBLICATIONS

McMaster-Carr Catalog, 1988, pp. 2012, 2200.

Primary Examiner—David A. Scherbel
Assistant Examiner—Creighton Smith
Attorney, Agent, or Firm—Robert M. Didrick; Robert H. Robinson; John M. Lorenzen

[57] ABSTRACT

This invention comprises a suspended ceiling grid system having an adjustable compression strut installed between the grid members of the system and the building or construction superstructure which lies in a plane above the suspended ceiling. The adjustable compression strut stabilizes the ceiling system and prevents upward movement of the system such as might occur during a seismic shock or earthquake tremor. The compression strut comprises two co-axial, telescoping cylindrical strut members having a spring clip attached to the inner end of the inner strut member that allows the strut to be extended but not retracted. The compression strut is installed by simply holding it in position between the suspended ceiling grid and the superstructure and then extending the strut members until they are locked in place by the action of the spring clip.

15 Claims, 3 Drawing Sheets

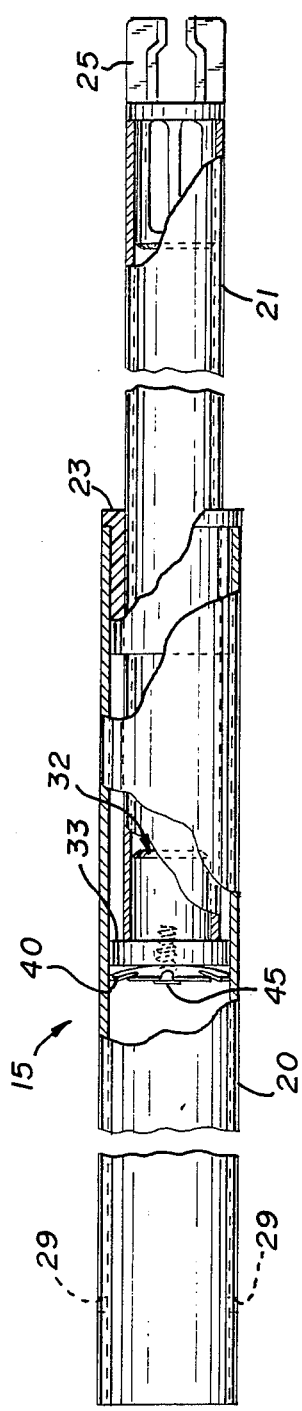
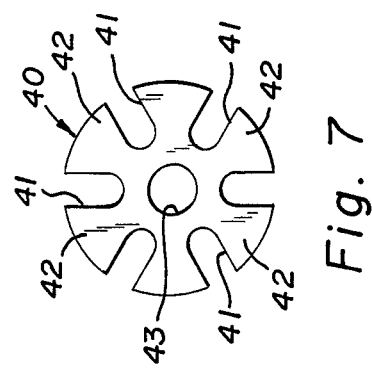
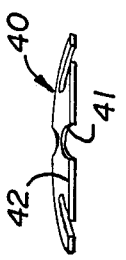
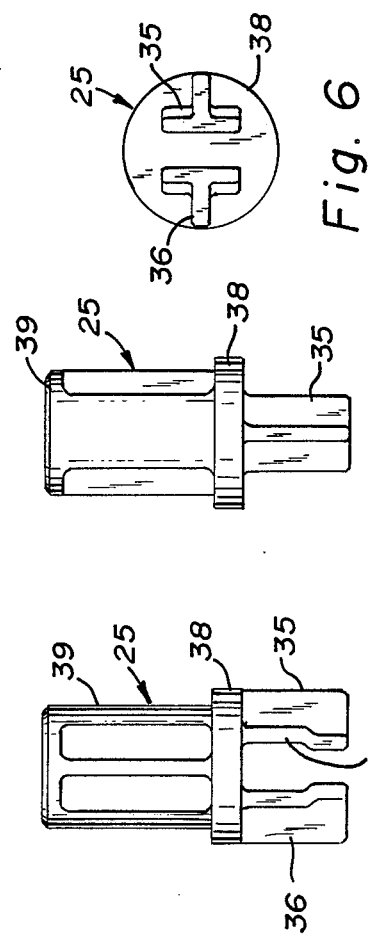

SUSPENDED CEILING CONSTRUCTION AND COMPRESSION STRUT THEREFOR

BACKGROUND OF THE INVENTION

1. Field of the Invention

This invention relates to suspended ceiling grid systems, and, more particularly, to an adjustable compression strut adapted to be installed between the grid members of such a system to the superstructure above, thereby stabilizing the ceiling system and preventing upward movement, such as might be encountered during an earthquake.

2. The Prior Art

The use of a rigid member or assembly of members in a suspended ceiling grid system for seismic protection is well known. Grid systems of this type are comprised of a plurality of parallel, spaced main grid members and usually include a plurality of cross grid members extending transversely between the main grid members. A plurality of grid openings is thereby formed in which tiles may be supported. The grid members generally are suspended from a conventional ceiling or an overhead support structure framework, either of which will hereinafter be referred to as a "superstructure." Frequently, the grid is suspended by means of hanger wires. However, hanger wires afford no resistance to upward movement of the suspended ceiling system, and forces such as encountered during a seismic disturbance may cause injuries to room occupants and damage to the ceiling system and nearby structures due to substantially unrestrained vertical motion of the ceiling system.

Accordingly, in installations where seismic disturbances are a concern, it is known in the art to provide a substantially rigid, vertical strut extending between the superstructure and the grid runners and cross runners below. Means have been provided for fixing the upper and lower ends of the strut to the superstructure and grid members, respectively. Also, the length of the strut should be adjustable, since the grid-to-superstructure distance may vary in a particular installation, and since clearance will be needed for installation of the strut.

There are several important design criteria of seismically protected suspended ceiling structures: The range of adjustability should be as great as possible. Installation should be easy, particularly the adjustment of the length of the strut, yet the strut must be rigid with good compressive strength. The length of the strut should not change once it is installed. The design should be compatible with a variety of grid member types. The struts should be of simple construction and easy to manufacture.

Various approaches have been taken to the design of such struts, as shown in the following representative United States Patents:

In U.S. Pat. No. 3,842,561, a strut is disclosed having an upper cylindrical member which telescopes into a hollow, square lower sleeve. A hanger wire passes inside the strut from the grid to the superstructure. The length of the strut is fixed by means of a set screw threaded through the square sleeve.

U.S. Pat. Nos. 3,995,823 and 4,545,166 both show suspension devices having support rods with C-shaped or V-shaped clamps for length adjustment.

U.S. Pat. No. 4,084,364 discloses a cylindrical strut with a spring-loaded clip at the lower end, the spring being contained within the tube. The clip attaches to the bulb of an inverted-tee grid member. By pushing down on the cylinder, the spring is compressed and the upper end of the strut can be brought into position against the superstructure. A suspension wire is installed near the strut to establish the distance between the grid and the superstructure.

Each of the designs known in the prior art have fallen short in some important aspect such as adjustability, rigidity, ease of installation, or simplicity.

SUMMARY OF THE INVENTION

The present invention addresses the shortcomings of the prior art by providing a suspended ceiling grid construction with a compression strut which is strong, rigid, easily installed, readily adjusted and locked, yet which is economically manufactured and assembled. According to a preferred embodiment of the idea, the strut comprises two, co-axial, telescoping cylindrical strut members with a one-way spring clip attached to the inner end of the inner strut member that allows the structure to be extended but not contracted. In the preferred embodiment, the spring clip is a disk that is dished and notched with petals so that it, and the inner strut member, may be pulled through the outer strut member with little resistance. When an attempt is made to push the spring clip back in to the outer strut member, however, the outer edges of the spring clip bite into the inner wall of the outer strut member making retraction of the strut impossible.

The lower end of the strut may be fabricated to fit over a grid member, or, as in the disclosed preferred embodiment, fitted with an end plug suitably shaped.

The strut of the invention is installed by simply holding it in position between the grid and the superstructure then extending the two strut members. When the strut is the correct length, fitting tightly, the length will be locked by the action of the spring clip.

Manufacture of the strut is made easier because close tolerances of the strut member diameters are not required. Instead, a bushing and a flanged plug are used to provide smooth telescoping movement.

The strut of the invention may be installed with or without an adjacent hanger wire. When the strut is adjacent a hanger wire, the invention provides a clip which engages the hanger wire and the strut.

In an alternate embodiment, a coil spring is provided between the spring clip and the end of the inner strut member.

BRIEF DESCRIPTION OF THE DRAWINGS

FIG. 3 is a side view of the strut according to FIG. 2 with portions cut away and in axial cross-section;

FIGS. 4, 5 and 6 are front, side and lower end views, respectively, of the strut end plug shown in FIG. 3.

FIGS. 7 and 8 are top and side views, respectively, of the spring clip shown in FIG. 3;

DESCRIPTION OF THE PREFERRED EMBODIMENTS

Figure 1:
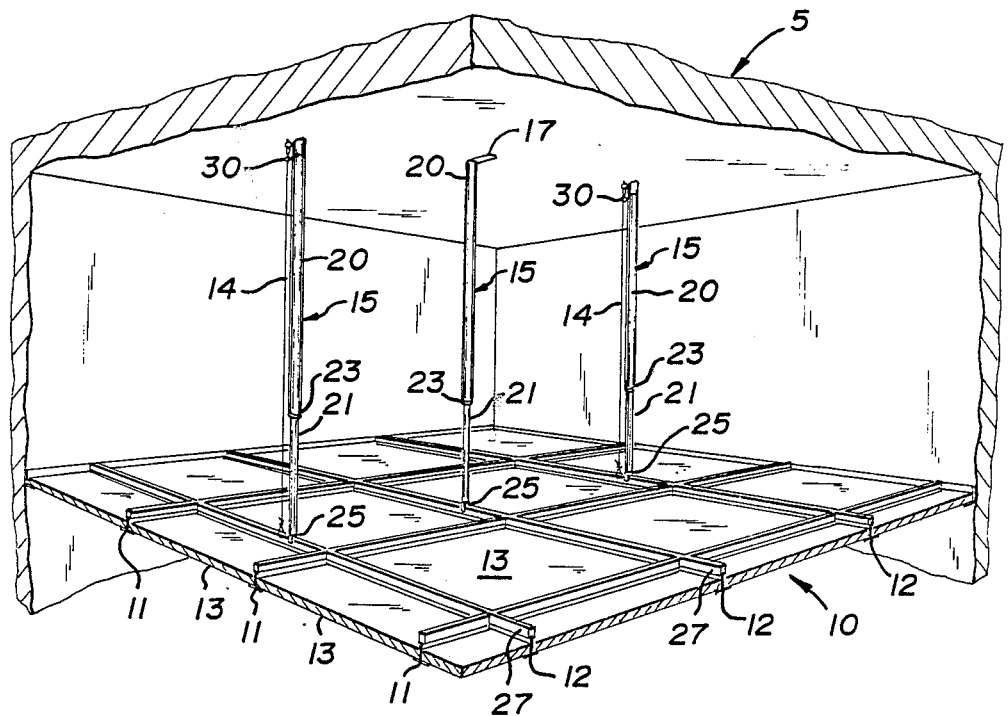
FIG. 1 is a fragmentary, elevational, perspective view of a suspended ceiling structure according to the invention.

By way of disclosing a preferred embodiment of the invention, and not by way of limitation, there is shown in FIG. 1 a fragment of a suspended ceiling structure 10 installed below a superstructure S. In its general organization, the ceiling structure includes a grid comprising a plurality of inverted-tee-shaped runners 11 and cross runners 12, tiles 13 supported in the openings of the grid, a plurality of hanger wires 14 which are fixed at their upper and lower ends to the superstructure and the grid, thus establishing the distance therebetween, and a plurality of compression strut assemblies 15 at spaced lateral intervals. For purpose of illustration, three strut assemblies 15 are shown at relatively close spacing. It should be understood, however, that in an actual installation the spacing between struts will be on the order of twelve feet. Two of the struts assemblies 15 are shown adjacent hanger wires 14, while a third is shown without a hanger wire but with an attachment clip 17 for securing the upper end of the strut in the proper position against the superstructure.

Figure 2:
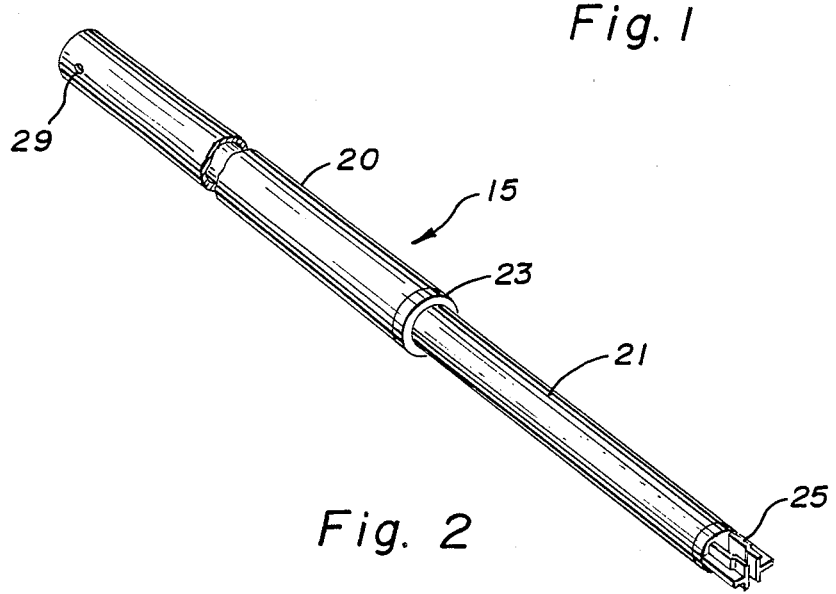
FIG. 2 is a perspective view of a compression strut according to the invention.

Referring now additionally to FIG. 2, it may be seen that each compression strut assembly is generally an elongated, two-part, telescoping cylinder including an upper, or first, or outer strut member 20, a lower, or second, or inner strut member 21, the outer diameter of the member 21 being somewhat smaller that the inner diameter of the member 20. At the lower end of the outer strut member 20 there is inserted a bushing 23 having a bore slightly larger than the outer diameter of the inner strut member 21.

At the lower end of the inner strut member there is inserted a lower end plug 25 having a bifurcation adapted to engage the bulb 27 formed at the top of the web of the grid runners 11 and cross runners 12. Near the upper end, the wall of the outer strut member 20 is provided with two, diametrically opposite holes 29. These holes receive the hooked ends of "wishbone" shaped top clips 30. As more fully described below, these top clips 30 encircle the hanger wires 14 and hold the compression strut assemblies 15 in adjacency with the hanger wires.

Figure 9:
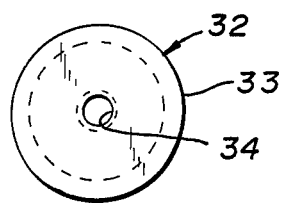
FIGS. 9 and 10 are lower end and side views, respectively of the inner strut member plug shown in FIG. 3.
Figure 10:
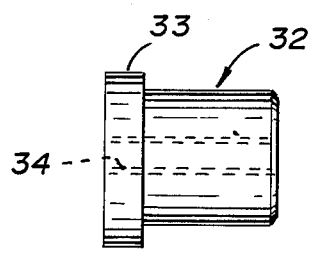

Referring to FIG. 3, further details of a compression strut assembly 15 may be seen. The bushing 23 is flanged and extends some distance into the end of the outer strut member 20 with a friction fit. At the upper and of the inner strut member 21 there is a flanged inner end plug 32 friction fit therein. As shown in FIGS. 9 and 10, the inner end plug 32 is generally cylindrical with a flange 33 at one end and an axial bore 34. The flange 33 of the inner end plug has an outer diameter slightly smaller than the inner diameter of the outer strut member 20. The close fit of the inner end plug flange 33 and the bushing 23 provide for smooth telescopic movement of the strut assembly.

The lower end plug 25 is shown in FIGS. 4, 5 and 6, and has a bifurcation comprising two legs 35 and 36 forming an opening 37 suitably shaped and dimensioned to engage a ceiling grid runner or cross runner. The lower end plug has a flange 38 and an upper extent 39 appropriate for a friction fit in the lower end of the inner strut member 21.

Referring again to FIG. 3, the inner end plug 32 at the upper, or inner, end of inner strut member 21 has a spring clip 40 attached thereto. As shown in FIGS. 7 and 8, the spring clip 40, preferably made of spring steel, is substantially in the form of a disk, with six, evenly spaced, radial notches, or slots 41 cuts cut along its perimeter, thereby forming six "petals" 42. In the center of the spring clip 40 there is a hole 43. As best shown in FIG. 8, the spring clip 40 is dished. The word "dished" is intended herein to include the shape of a spring clip that is initially flat, but takes on a concave or frustoconical shape by the bending of the petals when confined within the upper strut. The outer diameter of the dished, but unflexed, spring clip 40 is slightly larger than the inner diameter of the outer strut member 20.

Referring once more to FIG. 3, the spring clip 40 is fastened concave upward to the upper end of the inner strut member 21 by means of a screw, 45 passing through the hole 34 of the spring clip and into the bore of inner end plug 32. The screw also causes expansion of the inner plug, resulting in a tight friction fit of the inner plug in the inner strut member. Because of the relative diameters of the spring clip 40 and the outer strut member 20, the petals 42 of the spring clip are flexed inwardly with the outer edges of the spring clip pressed tightly against the inner wall of the outer strut member 20. As a result of this arrangement, the strut assembly may be axially extended by pulling the two members 20 and 21 apart; however, when the strut assembly is axially compressed, the edges of the spring clip bite into the inner wall of the outer strut member and prevent any telescopic contraction of the strut assembly.

Figure 11:
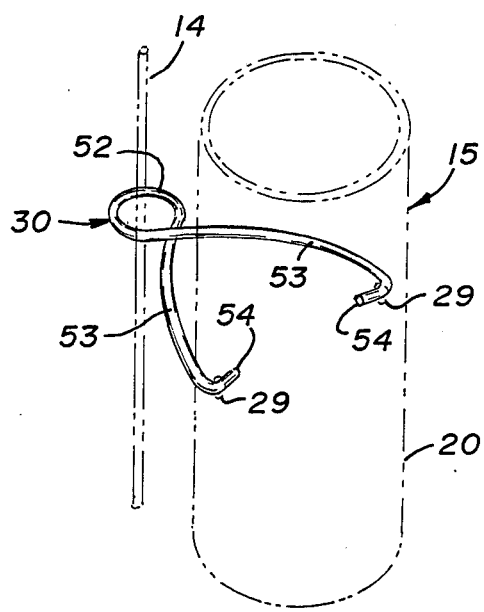
FIG. 11 is a perspective view of a spring clip according to the invention, illustrating the attachment of the clip to a hanger wire and an adjacent strut.

In FIG. 11 there is shown a wire clip 30 used to position a strut assembly 15 adjacent a hanger wire. The wire clip 30 is made of a single piece of wire formed in a wishbone shape to include an intermediate loop 52, and two diverging legs 53 having hook portions 54 at their ends. The hook portions 54 are adapted to engage the holes 59 formed through the wall of the outer strut member 20.

Figure 12:
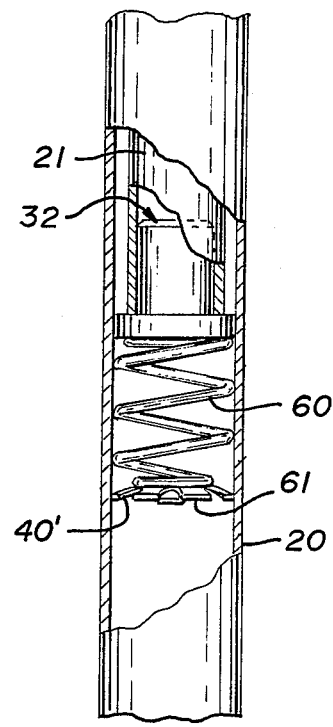
FIG. 12 is a side, elevational view, with portions cut away, of the strut according to the invention showing an alternate arrangement of the strut having a helical spring.

FIG. 12 illustrates an alternate embodiment of the invention wherein a helical spring 60 is used in the strut assembly 15. One end of the spring 60 is attached to the inner plug 32. The other end of the spring 60 is attached to the spring clip 40' by means of an appropriate attachment device 61. This arrangement allows for a certain degree of vertical movement of the ceiling construction. Furthermore, when installed with the spring compressed, the strut will be able to lengthen somewhat to compensate for any shifting of the ceiling such as might be caused by loosening or stretching of the hanger wires, or by objects bumping up against the grid.

Referring again to FIG. 1, it will be seen that a compression strut 15 may be installed not adjacent to a hanger wire. This may be done with a ceiling clip 17 such as is disclosed in U.S. Pat. No. 4,084,364. A clip of this type is fixed in place to the superstructure and has means for engaging the upper end of the strut assembly.

Installation of the ceiling system according to the invention is made as follows: The compression strut assemblies 15 are fabricated in predetermined nominal lengths appropriate to the ceiling-to-superstructure distance and are delivered to the construction site in the retracted, or contracted, condition. The grid runners and cross runners are assembled and suspended from the superstructure in a conventional, well-known manner, usually with hanger wires. Next, a location where a compression strut is desired is identified. If the location is adjacent a hanger wire 14, a wire clip 50 may now or later be looped around the hanger wire and the hook ends 54 of the wire clip engaged with the holes 29 near the upper end of the strut assembly. The strut assembly is held in approximate position while the upper and lower members 20, 21 are extended axially. As the strut nears its ultimate length, the legs 35 and 36 of the lower end plug 25 are put in position around the bulb of the grid member below and the strut assembly is extended further to put the strut assembly in compression. Alternatively, the upper end of the strut assembly may engage an clip above such as clip 17.

To simplify the above procedure to its essential terms, the strut assembly is merely held in position then lengthened as far as it will go. The spring clip 40 automatically locks the length.

Suitable materials for practicing the invention include galvanized steel for the strut members, spring steel for the spring clip, and molded resins such as Delrin brand resin for the plugs and bushings.

Among other possible variations, the strut assembly may be constructed with the outer strut member telescoping within the lower member, as is shown in FIG. 12. Instead of using a plug 25 in the lower end of the inner strut member 21, it is possible to form the end of the inner strut member 21 itself to engage the suspended ceiling runners and cross-runners. Other variations and modifications to the preferred embodiment are possible without departing from the scope and spirit of the appended claims.

I claim:

1. A suspended ceiling construction comprising:
   a plurality of grid members suspended below a superstructure; and
   at least one compression strut assembly extending between said superstructure and one of said grid members, said compression strut assembly comprising
      an elongated, tubular outer strut member having an inner surface and an elongated inner strut member in axial, telescoping relationship with said outer strut member, a first end of said inner strut member disposed within said outer strut member;
      locking means fixed to the first end of said inner strut member, said locking means engaging the inner surface of the outer strut member and allowing axial extension of the compression strut assembly but preventing axial contraction thereof, said locking means comprising a resilient disk spring clip having edges biting into the inner surface of the outer strut member.

2. The construction of claim 1 wherein said disk is dished and formed with radial notches and petals, the outer edges of the petals pressing against the inner surface of the outer strut member.

3. The construction of claim 2 wherein said hanger wire clip means comprises a wishbone shaped wire having an intermediate loop for encircling the hanger wire, two divergent legs extending outwardly from said loop, and means at the ends of said legs for engaging said compression strut assembly.

4. The construction of claim 1 wherein an outer end of the compression strut assembly includes means for engaging a grid member.

5. The construction of claim 4 wherein said means for engaging a grid member comprises an end plug having a bifurcation receiving the grid member.

6. The construction of claim 1 further comprising a helical spring disposed between the locking means and the first end of the inner strut member.

7. The construction of claim 1 wherein said inner and outer strut members are cylindrical and further comprising a bushing inserted in the first end of said outer member, said bushing having an inner diameter slightly larger than the outer diameter of said second strut member, and a flanged plug inserted in the first end of the inner strut member, the diameter of the flange being slightly smaller that the inner diameter of the outer strut member.

8. A compression strut assembly for the vertical stabilization of a suspended grid ceiling comprising:
   an elongated, tubular outer strut member having an inner surface and an elongated inner strut member in axial, telescoping relationship with said outer strut member, a first end of said inner member inserted into a first end of said outer member;
   locking means fixed to the first end of said inner strut member allowing axial extension of the compression strut assembly but preventing axial contraction, said locking means comprising a resilient disk spring clip having edges biting into the inner surface of the outer strut member.

9. The construction of claim 8 wherein said disk is dished and formed with radial notches and petals, the outer edges of the petals pressing against the inner surface of the outer strut member.

10. The construction of claim 8 wherein an outer end of the compression strut assembly includes means for engaging a grid member.

11. The construction of claim 10 wherein said means for engaging a grid member comprises an end plug having a bifurcation adapted to receive the grid member.

12. The construction of claim 11 further comprising a helical spring disposed between the locking means and the first end of the inner strut member.

13. The construction of claim 11 wherein said inner and outer strut members are cylindrical and further comprising a bushing inserted in the first end of said outer member, said bushing having an inner diameter slightly larger than the outer diameter of said second strut member, and a flanged plug inserted in the first end of the inner strut member, the diameter of the flange being slightly smaller that the inner diameter of the outer strut member.

14. A method for installing a compression strut in a suspended grid ceiling construction comprising the steps of:
   providing a compression strut assembly having inner and outer telescoping elongated members with means for allowing axial extension of the strut but not contraction,
   positioning the strut assembly vertically between the superstructure and a member of the suspended grid,
   axially extending the strut assembly until it fits tightly between the superstructure and the grid member; and
   clipping the strut assembly to an adjacent hanger wire.

15. A suspended ceiling construction comprising:
   a plurality of grid members suspended below a superstructure;
   at least one hanger wire extending from the superstructure to one of said grid members; and at least one compression strut assembly disposed adjacent said hanger wire extending between said superstructure and one of said grid members, said compression strut comprising an elongated, tubular outer strut member having an inner surface and an elongated inner strut member in axial, telescoping relationship with said outer strut member, a first end of said inner strut member disposed within said outer strut member; and locking means fixed to the first end of said inner strut member, said locking means engaging the inner surface of the outer strut member and allowing axial extension of the compression strut assembly but preventing axial contraction thereof; and a hanger wire clip means engaging said hanger wire and said compression strut assembly.

* * * * *